United States Patent Office 3,373,526
Patented Mar. 19, 1968

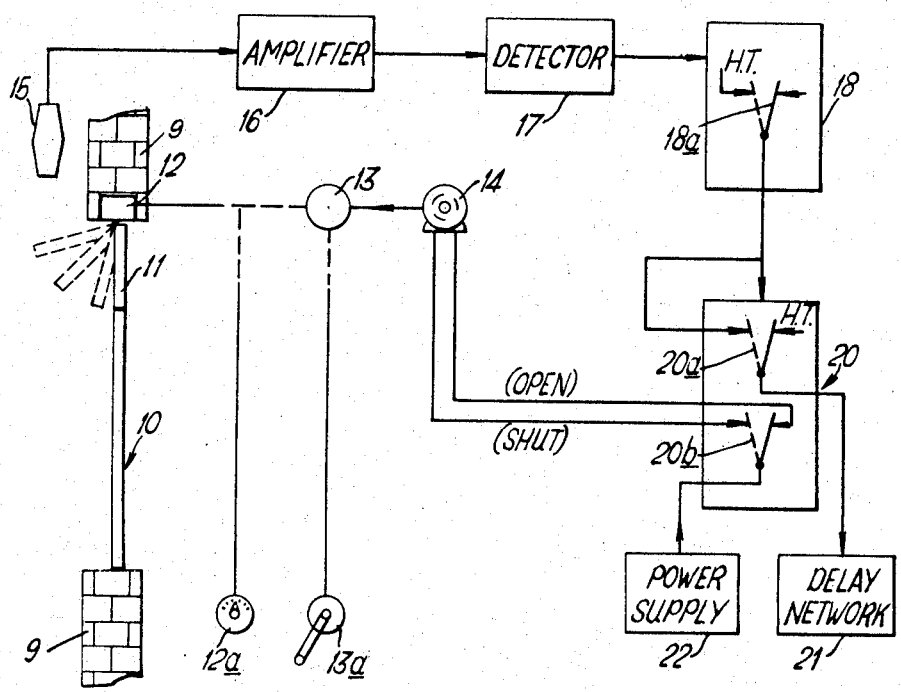

3,373,526
ACOUSTICALLY CONTROLLED
CLOSURE APPARATUS
Peter Hubert Parkin, Garston, Watford, England, assignor to National Research Development Corporation, London, England, a corporation of Great Britain
Filed May 25, 1965, Ser. No. 458,651
11 Claims. (Cl. 49—25)

This invention relates to acoustically controlled closure apparatus.

According to the invention there is provided acoustically controlled closure apparatus comprising an apertured member adapted to form part of a boundary wall of an enclosure, a closure member adapted to be moved between a closed position in which an aperture in the apertured member is closed and at least one open position in which the said aperture is at least partially opened, a sound detection device adapted to be responsive to the noise level internally or externally of the enclosure, and control means which are controlled by the sound detection device and which, when the closure member is at least partially open and the sound detection device detects an external noise level in excess of a predetermined level, first closes the closure member and after the noise level has fallen below the said predetermined level, subsequently re-opens the closure member, so as to restore it to its at least partially open position.

The invention has a particular appplication to the automatic closing and opening of windows, sky-lights, ventilators and the like closure members in the external walls of buildings. When buildings are situated in places, for example near airports, where the external noise level undergoes large increases of short duration at irregular intervals, it is desirable during such periods of increased noise to shut the closure members in the external walls to insulate acoustically the interior of the building, and to open them again when the external noise level has subsided. Apparatus in accordance with the present invention enables these functions to be performed automatically.

If the sound detection device is set to respond to a noise level which is higher than the normal external noise level but less than the noise level resulting from, say, the overhead passage of an aircraft, then the closure member of the apparatus of the present invention will be automatically shut as the aircraft passes, thereby considerably reducing the sound intensity which penetrates to the interior of the building.

Means are preferably provided to ensure that there will always be a predetermined time delay between the closing of the closure member and its subsequent re-opening.

Thus, in the case of aircraft noise, the closure member is not opened until a predetermined time interval has elapsed after the aircraft has passed. This feature is desirable when, for example, a building is situated near a busy air terminal, where the passage of a number of aircraft overhead in close succession often occurs. This would result, without such a time delay, in the closing and opening of the closure member in rapid succession, which is undesirable as it is both wasteful of power and causes undue wear on the moving parts involved. When such a time delay means is provided, the closure member will remain shut throughout the passage of a succession of aircraft overhead, provided the interval between consecutive aircraft is less than the said predetermined delay. A typical time delay could for example, be half a minute.

Means are also preferably provided for adjusting the sound detection device so as to adjust the range of audio frequencies to which it is responsive and/or to adjust the value of the said predetermined noise level.

The sound detection device of the apparatus of the present invention preferably include a microphone connected to an audio-amplifier which is designed to amplify predominantly signals the frequency of which is within a predetermined frequency range. The use of such an amplifier enables the sound detection device to differentiate between the sound from which it is required to insulate the interior of the enclosure, such as aircraft engine noise, from spurious external sounds of high intensity (such as would be detected by the sound detection device, if, for example, a bird were in proximity to the microphone) against which insulation of the interior of the enclosure is not required.

Preferably there is included in the control means power means adapted to open or close said closure member, and a relay adapted to actuate said power means in the sense of closing the closure member on receipt of a signal from the sound detection device corresponding to an external noise level in excess of the said predetermined level.

There is preferably also included in the control means a second relay adapted to actuate said power means in the sense of opening the closure member only after the external noise level has fallen below said predetermined level.

The control means preferably further includes a delay circuit adapted to introduce a predetermined delay between the falling of the external noise level below the said predetermined level and the operation of said second elay.

The invention is illustrated, merely by way of example, in the accompanying drawing, which shows diagrammatically an acoustically controlled apparatus according to the present invention.

Referring to the drawing, an external wall 9 of a building is provided with a window (e.g. of double glazed construction) which has a fixed lower portion 10. The window also has a ventilator portion 11 which may be moved by an hydraulic actuator 12 between a closed position (indicated in full lines in the drawing) in which it closes the aperture between the window portion 10 and the part of the wall 9 vertically above it, and a series of at least partially open positions which are indicated by dotted lines in the drawing.

The actuator 12 is supplied with pressure fluid by a pump 13 driven by an electric motor 14, one direction of rotation of the motor 14 resulting in an opening movement of the ventilator 11 and the other direction of rotation of the motor 14 resulting in a closing movement of the ventilator 11.

A selector switch 12a is provided which controls the operation of the actuator 12, the selector switch 12a being settable to select the extent to which it is desired that the actuator 12 should open the ventilator 11. A manual lever 13a is provided on the pump 13 to enable the pump 13 to be operated manually in the event of an electric power failure.

Although only one ventilator 11 is shown in the drawing it will be appreciated that the pump 13 and motor 14 may be connected to a number of actuators 12 to open and close a number of ventilators 11 or of other closure members.

A microphone 15 forms part of a circuit shown in block schematic form in the drawing. The microphone may be located on the exterior of the building as shown or on the interior of the building. The latter arrangement would be employed if it was desired to open and close the closure member in dependence upon the noise level inside the building, such as might be the case if occasional loud noises were generated within the building due, for example, to machinery housed therein, and it was required to shield the outside of the building from the noise generated within it.

Audio signals detected by the microphone 15 are amplified in a high gain audio amplifier 16, the output of which is passed to a detector 17. The detector 17 produces a smoothed voltage signal the magnitude of which is dependent on the audio signal strength detected by the microphone 15. This voltage signal is applied to the input of a relay 18 having contacts 18a. If the voltage signal exceeds a predetermined value as determined by the bias of certain values (not shown) which form part of the relay 18, the relay 18 is energised and the relay contacts 18a move from the position in which they are shown in full lines to the positions indicated by dotted lines thereby connecting an H.T. supply to the input of a second relay 20, to energise the relay 20.

The relay 20 has contacts 20a and 20b, which move from the positions shown in full lines to the positions shown by dotted lines, when the relay 20 is energised as described above. In the full line position the contact 20b connects a power supply 22 to the motor 14, which drives the pump 13 so as to maintain the ventilator 11 in the open setting as selected by the selector switch 12a. In moving to the dotted line position, however, the contact 20b reverses the connection of the power supply 22 to the motor 14, reversing the direction of rotation of the motor and thereby causing the ventilator 11 to be moved into, and retained in, its closed position.

Retaining clips (not shown) operated by the actuator 12 may be provided to press the ventilator 11 into contact with rubber seating (not shown) in the closed position to improve the degree of sound insulation afforded by the closed ventilator 11.

Contact 20a of relay 20 is connected to a delay network 21. In the full line position contact 20a causes the delay network 21 to be charged from the H.T. supply while in the dotted line position contact 20a connects the delay network 21 to the input of relay 20.

In operation, when the external noise level exceeds the predetermined level (e.g. because of the passage of an aircraft overhead) relays 18 and 20 become energised causing the ventilator 11 to close in the manner described above. When the external noise level falls below the predetermined level (e.g. after the passage of the aircraft) the relay 18 is de-energised and the contacts 18a return to the full line position, thereby cutting off the H.T. supply to the input of relay 20. The input voltage of relay 20 does not, however, fall immediately to a low value, but decreases with a rapidity dependent on the time constant of the delay network 21, which may typically be about 30 seconds. As a result, the relay 20 remains energised for a predetermined time after the external noise level has fallen. After the predetermined time delay the input voltage of relay 20 has decreased sufficiently to cause the relay 20 to become de-energised whereupon contacts 20a and 20b return to their full line positions. The direction of rotation of the motor 14 is then reversed and the ventilator 11 thus opened to its original setting as determined by the selector switch 12a.

The predetermined external noise level which on being exceeded causes the relay 18 to "trip" in the manner described above is adjustable by means of a potentiometer (not shown) in the detector 17.

The audio amplifier 16 may be rendered frequency selective by means of a suitable low-pass filter (not shown) in the input circuit thereto, whereby only sounds of low audio frequency, of the order, for example of 1,000 cycles per second or less, are amplified if it is desired to render the amplifier 16 sensitive to low frequency aircraft engine noise.

I claim:

1. Acoustically controlled closure apparatus comprising an apertured member adapted to form part of a boundary wall of an enclosure, a closure member movable between a closed position in which an aperture in the apertured member is closed and at least one open position in which the said aperture is at least partially opened, a sound detection device responsive to a predetermined noise level about the enclosure, control means which are controlled by the sound detection device and delay means included in said control means said control means operating, when the closure member is at least partially open and the sound detection device detects a noise level in excess of said predetermined level, first to close the closure member and, a predetermined time, determined by said delay means, after the noise level has fallen below the said predetermined level, subsequently to re-open the closure member to restore it to its at least partially open position.

2. Acoustically controlled closure apparatus comprising an apertured member adapted to form part of a boundary wall of an enclosure, a closure member movable between a closed position in which an aperture in the apertured member is closed and at least one open position in which the said aperture is at least partially opened, a sound detection device responsive to a predetermined noise level about the enclosure, means for adjusting the sound detection device to adjust the range of audio frequencies to which it is responsive and control means which are controlled by the sound detection device, said control means operating, when the closure member is at least partially open and the sound detection device detects a noise level in excess of said predetermined level, first to close the closure member and, after the noise level has fallen below the said predetermined level, subsequently to re-open the closure member to restore it to its at least partially open position.

3. Apparatus as claimed in claim 2 wherein said means for adjusting the sound detection device serves also for adjusting the value of said predetermined noise level.

4. Acoustically controlled closure apparatus comprising an apertured member adapted to form part of a boundary wall of an enclosure, a closure member movable between a closed position in which an aperture in the apertured member is closed and at least one open position in which the said aperture is at least partially opened, a microphone responsive to a predetermined noise level about the enclosure, an audio amplifier which is connected to said microphone to amplify predominantly signals therefrom the frequency of which is within a predetermined frequency range and control means which are controlled by the sound detection device, said control means operating, when the closure member is at least partially open and the sound detection device detects a noise level in excess of said predetermined level, first to close the closure member and, after the noise level has fallen below the said predetermined level, subsequently to re-open the closure member to restore it to its at least partially open position.

5. Acoustically controlled closure apparatus comprising an apertured member adapted to form part of a boundary wall of an enclosure, a closure member movable between a closed position in which an aperture in the apertured member is closed and at least one open position in which the said aperture is at least partially opened, a sound detection device responsive to a predetermined noise level about the enclosure, power means for opening or closing said closure member, and control means including a first relay device which is controlled by the sound detection device and which actuates said power means in the sense of closing the closure member when the closure member is at least partially open on receipt of a signal from the sound detection device corresponding to a noise level in excess of said predetermined level, said control means including means, after the noise level has fallen below the said predetermined level, to operate subsequently to re-open the closure member to restore it to its at least partially open position.

6. Apparatus as claimed in claim 5 wherein the control means also includes a second relay device for actuating said power means in the sense of opening the closure member and a delay circuit for introducing a predetermined delay between the falling of the noise level below the said predetermined level and the operation of said second relay device.

7. Acoustically controlled closure apparatus comprising an apertured member adapted to form part of a boundary wall of an enclosure, a closure member movable between a closed position in which an aperture in the apertured member is closed and a plurality of partially open positions in which the said aperture is at least partially opened, selector means for placing the closure member in any selected one of said partially open positions a sound detection device responsive to a predetermined noise level about the enclosure, and control means which are controlled by the sound detection device said control means operating, when the closure member is in one of said partially open positions and the sound detection device detects a noise level in excess of said predetermined level, first to close the closure member and, after the noise level has fallen below the said predetermined level, subsequently to re-open the closure member to restore it to its partially open position.

8. Acoustically controlled closure apparatus comprising an apertured member adapted to form part of a boundary wall of an enclosure, a closure member movable between a closed position in which an aperture in the apertured member is closed and at least one open position in which the said aperture is at least partially opened, a sound detection device responsive to the noise level externally of the enclosure, and control means controlled by the sound detection means and including means responding, when the closure member is at least partially open and the sound detection device detects an external noise level in excess of a predetermined level, to close the closure member and, after the noise level has fallen below the said predetermined level, subsequently to restore the closure member to its at least partially open position.

9. Acoustically controlled closure apparatus as claimed in claim 8 in which the control means include delay means operative to delay the subsequent restoration of the closure member to its at least partially open position by a predetermined time after the noise level has fallen below the said predetermined level.

10. Acoustically controlled closure apparatus as claimed in claim 8 in which the sound detection device comprises a microphone and an audio amplifier which is connected to said microphone and which amplifies predominantly signals therefrom the frequency of which is within a predetermined frequency range.

11. Acoustically controlled closure apparatus as claimed in claim 8 including selector means for placing the closure member in any selected one of a plurality of partially open positions.

References Cited

UNITED STATES PATENTS

| | | | |
|---|---|---|---|
| 1,934,859 | 11/1933 | Joaquin et al. | 340—148 X |
| 2,008,408 | 7/1935 | Thompson | 318—460 X |
| 2,136,907 | 11/1938 | Roder | 318—460 X |
| 3,249,148 | 5/1966 | Zablodil et al. | 160—3 |

DAVID J. WILLIAMOWSKY, *Primary Examiner.*

REINALDO P. MACHADO, *Examiner.*

J. KARL BELL, *Assistant Examiner.*